(12) United States Patent
Webster et al.

(10) Patent No.: US 9,217,469 B2
(45) Date of Patent: Dec. 22, 2015

(54) SPLIT RING COMPONENT

(75) Inventors: Patrick Webster, Kings Lynn (GB);
Martin Caspall, Kings Lynn (GB)

(73) Assignee: Cooper Roller Bearings Company Ltd., Norfolk (GB)

( * ) Notice: Subject to any disclaimer, the term of this patent is extended or adjusted under 35 U.S.C. 154(b) by 959 days.

(21) Appl. No.: 13/395,045

(22) PCT Filed: Sep. 21, 2010

(86) PCT No.: PCT/GB2010/051579
§ 371 (c)(1),
(2), (4) Date: Mar. 8, 2012

(87) PCT Pub. No.: WO2011/039526
PCT Pub. Date: Apr. 7, 2011

(65) Prior Publication Data
US 2012/0211470 A1 Aug. 23, 2012

(30) Foreign Application Priority Data
Sep. 29, 2009 (GB) .................................. 0917068.9

(51) Int. Cl.
*F16C 33/51* (2006.01)
*F16C 33/48* (2006.01)
*B23H 9/00* (2006.01)
(Continued)

(52) U.S. Cl.
CPC *F16C 33/48* (2013.01); *B23H 9/00* (2013.01); *F16C 19/38* (2013.01); *F16C 33/504* (2013.01); *F16C 33/60* (2013.01);
(Continued)

(58) Field of Classification Search
CPC ........ F16C 33/48; F16C 33/60; F16C 33/504; F16C 19/38; F16C 2226/74; F16C 33/30; F16C 33/38; F16C 33/3862; F16C 33/40; F16C 33/405; F16C 33/58; F16C 33/585; B23H 9/00; Y10T 29/49691; B23P 15/003; B29L 203/04

See application file for complete search history.

(56) References Cited

U.S. PATENT DOCUMENTS

| 543,262 A | 7/1895 | Mossberg |
| 3,199,935 A | 8/1965 | Pitner |

(Continued)

FOREIGN PATENT DOCUMENTS

| DE | 8008271 U1 | 6/1980 |
| DE | 195 19 798 | 12/1995 |

(Continued)

OTHER PUBLICATIONS

International Search Report of International Application No. PCT/GB2010/051579 dated Nov. 26, 2010.
(Continued)

*Primary Examiner* — David Bryant
*Assistant Examiner* — Jun Yoo
(74) *Attorney, Agent, or Firm* — Fay Sharpe LLP

(57) ABSTRACT

A method of splitting a ring, such as a cage, for a bearing, such as a roller or ball bearing, includes splitting a ring in such a way that there are provided projections and recesses in the facing surfaces thereby produced. In this manner, the two halves of the split ring may be reassembled in opposite orientation so that the projections on the facing surfaces of the two halves of the ring engage one another to space the two halves of the ring apart and to restore the ring to a circular ring shape despite some of the material of the ring having been removed in the splitting process.

17 Claims, 4 Drawing Sheets

(51) Int. Cl.
*F16C 19/38* (2006.01)
*F16C 33/50* (2006.01)
*F16C 33/60* (2006.01)

(52) U.S. Cl.
CPC ........ *B23H 2200/10* (2013.01); *F16C 2226/74* (2013.01); *Y10T 29/49691* (2015.01)

(56) References Cited

U.S. PATENT DOCUMENTS

| | | | |
|---|---|---|---|
| 3,251,118 A | 5/1966 | Pitner | |
| 3,431,037 A | 3/1969 | Benson | |
| 3,494,684 A | 2/1970 | Benson | |
| T102,401 I4 | 11/1982 | Toth | |
| 4,475,777 A | 10/1984 | Hofmann et al. | |
| 5,184,899 A | 2/1993 | Harimoto | |
| 5,261,159 A * | 11/1993 | Yasuda et al. | 29/898.066 |
| 5,630,669 A * | 5/1997 | Stewart | 384/570 |
| 6,666,584 B2 | 12/2003 | Yokota | |
| 6,692,156 B1 | 2/2004 | Ohura et al. | |
| 6,981,801 B2 | 1/2006 | Yokota | |
| 7,258,492 B2 | 8/2007 | Yoon | |
| 7,270,484 B2 | 9/2007 | Waseda | |
| 7,866,891 B2 | 1/2011 | Waseda et al. | |
| 8,057,105 B2 | 11/2011 | Earthrowl et al. | |
| 8,136,998 B2 | 3/2012 | Murata et al. | |
| 2007/0116393 A1 | 5/2007 | Oishi et al. | |
| 2012/0211470 A1 | 8/2012 | Webster et al. | |

FOREIGN PATENT DOCUMENTS

| | | |
|---|---|---|
| GB | 961203 A | 6/1964 |
| JP | H05-89952 U | 12/1993 |
| JP | 2000240660 A1 | 9/2000 |
| WO | WO 2013/175922 A1 | 11/2013 |

OTHER PUBLICATIONS

Written Opinion of International Application No. PCT/GB2010/051579 dated Nov. 26, 2010.

* cited by examiner

SPLIT RING COMPONENT

The present invention relates to a split ring component. Although applicable to other circumstances, the preferred arrangement of the invention relates to a split cage for a bearing such as a split roller bearing.

As is well-known, bearings for shafts normally comprise an outer race mounted in a housing, and an inner race mounted to rotate with the shaft, and rolling elements placed between the inner and outer races. The rolling elements of the bearing may be in the form of rotating balls which are mounted in a cage, or, as will be described in relation to this preferred arrangement of the invention, rollers, which once again are mounted in a cage between the inner and outer races.

In order to maintain the bearing, that is to replace worn components or the like, it is often preferable to be able to remove the races and rolling elements from the shaft without removing the shaft and this can be done by providing a split outer housing, that is an outer housing which surrounds the shaft but which is split in a plane parallel to the axis of the shaft (typically horizontally so that the upper half of the outer housing may be removed for servicing), similarly split inner and outer races and similarly the cage mounting the rolling elements may also be split in a plane which is parallel to the axis of the shaft.

In some simple arrangements, it may be sufficient to provide the cage in the form of two moulded or otherwise manufactured semi-circular components.

Sometimes, it is preferred to make the cage as an annulus, and then to split the cage. It is necessary to cut the cage in some way or another to split it and this can be carried out in various ways. Typically, the cut may be by means of various blades. In a more sophisticated arrangement, the cut may be provided by spark erosion by means of, for example, a wire of an electrical discharge machining (EDM) apparatus which passes through the ring.

All of these splitting processes require the removal of some metal, and consequently when the two halves of the cage are reassembled, they no longer form a perfect circle. This may be overcome in a variety of ways, for example, by holding the two halves together by means of clips which include a spacer which is inserted between the two semi-circular halves of the cage and thereby brings the cage back to a proper diameter, but this is undesirable in practice.

SUMMARY OF THE INVENTION

In essence the invention provides a method of splitting a ring, such as a cage for a bearing such as a roller or ball bearing, in such a way that there are provided projections and recesses in the facing surfaces, whereby the two halves of the split ring may be reassembled in opposite orientation so that the projections on the facing surfaces of the two halves of the ring engage with one another to space the two halves of the ring apart, to restore the ring to a circular ring shape despite some of the material of the ring having been removed in the splitting process.

Preferably the splitting process is carried out on diametrically opposite sides of the ring.

Preferably the splitting process is carried out on each of the opposite sides of the ring simultaneously.

Preferably the splitting process is carried out on opposite sides of the ring in such a way as to provide an identical cut pattern on the facing surfaces of the two halves of the ring.

The ring may have a first edge and a second opposite edge, and engaging projections are provided on opposite sides of a circumferential line central between the first and second edges. The projections on each side of the central circumferential line may be provided in pairs which are equidistant from the central circumferential line.

The reassembling process in opposite orientation is carried out by rotating one half of the split ring through 180° about an axis at right-angles to the axis of the ring and at right-angles to a line between the cuts in the ring.

BRIEF DESCRIPTION OF THE DRAWINGS

A preferred embodiment of the invention will now be described by way of example only with reference to the accompanying drawings in which.

DESCRIPTION OF PREFERRED EMBODIMENT OF THE INVENTION

As set out above, particularly where a bearing mounts a shaft which by virtue of its size or weight or position is relatively difficult to remove it is common to provide a split bearing assembly whereby one can remove the upper half of the bearing components for servicing or replacing parts of the bearing.

Figure 1:
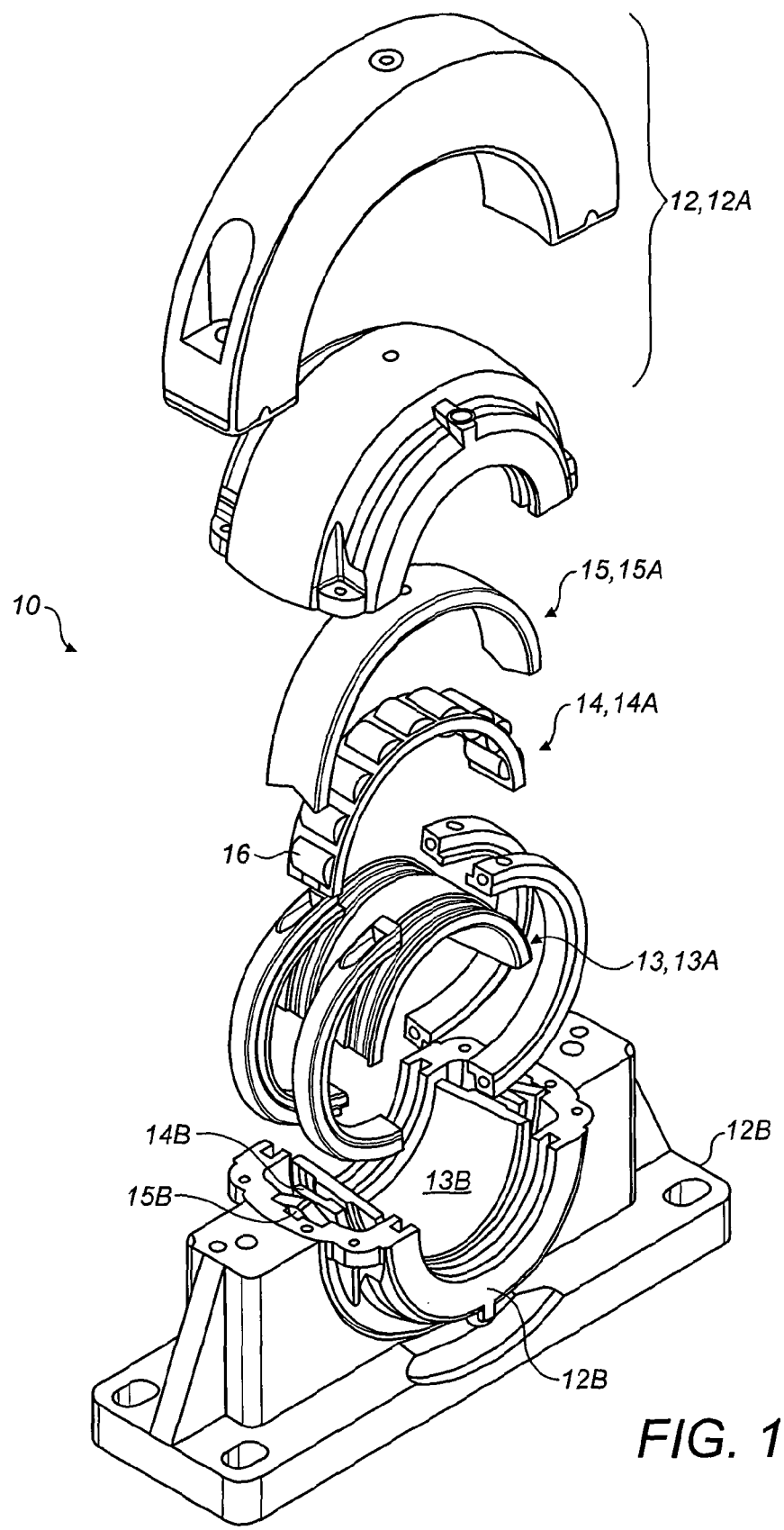
FIG. 1 is a perspective view of a split type of a non-taper roller bearing.

FIG. 1 shows a perspective view of such a bearing which in this case is a roller bearing 10. The roller bearing mounts a shaft 11. The bearing 10 comprises an outer housing part 12, and inner and outer races 13 and 15. The outer housing part 12 is split into two halves 12A, 12B in a horizontal plane through the axis of rotation of the shaft. The inner and outer races 13 and 15 are similarly split into an upper 13A, 15A and lower 13B, 15B parts respectively. Mounted between the inner and outer races is a cage 14 mounting rollers 16. The rollers 16 rolling between the inner and outer races provide the relative rotation between the shaft and the housing.

It is necessary for the cage 14 to be split about a plane passing through the axis A-A of rotation to the shaft.

We will now refer to the cage 14. It is clear that the cage 14 must be exactly circular and thus the two halves of the cage provided when it is split must be semicircular. Whilst in some circumstances the cage 14 may be moulded into two halves, for accuracy it is preferred to manufacture the cage 14 as a ring. In normal manufacture, the cage will be machined from a solid ring and then cut in half. Usually, if a cage is made from a solid ring and then cut in half, the joints of the cage between the two halves of the cages must somehow be packed or held apart to compensate for the material removed or else there must be some subsequent machining to true-up certain features of the cage. Alternatively, the cage may be made from two parts from the outset, but this requires careful machining in order that the two halves are properly matched.

Figure 2:
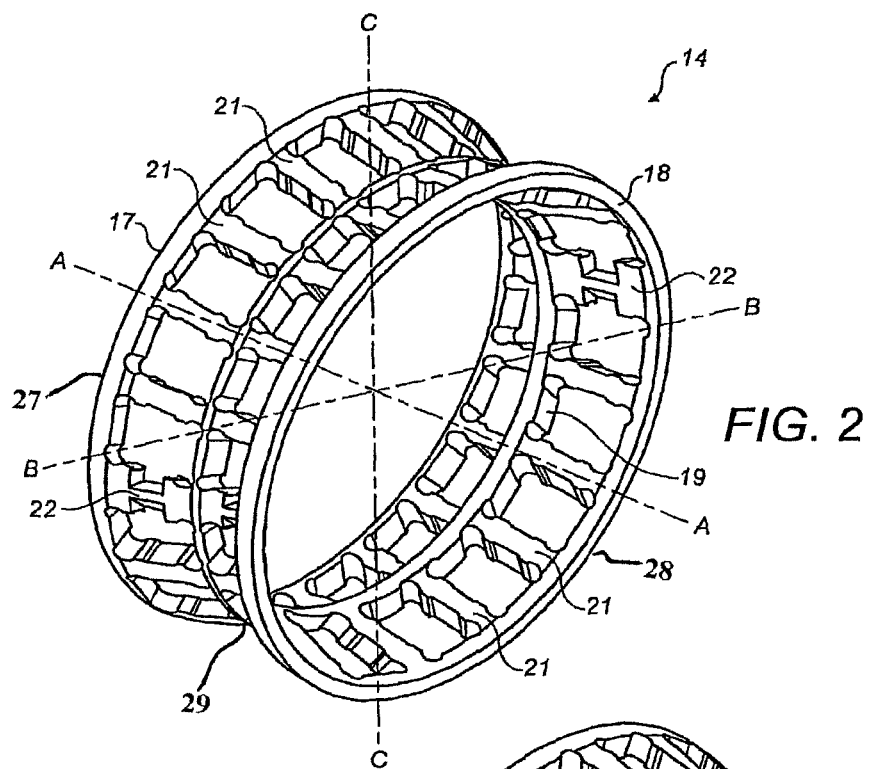
FIG. 2 is a perspective view of the roller bearing cage (in this case a taper roller bearing, although the invention is applicable to taper and non taper roller bearings) as manufactured before splitting, the cage having an axis of rotation A-A.

FIG. 2 shows such a cage after manufacture and before splitting. In essence the cage 14 comprises three rings, outer rings 17, 18 of a large diameter and an inner ring 19 of a smaller diameter. The rings 17, 18, 19 are connected together in the form shown in FIG. 2 by struts 21 and 23.

The cage has a first edge 27 and an opposite second edge 28, a central circumferential (dashed) line 29 being shown equidistant from the two edges 27, 28.

The cage is manufactured usually of brass or bronze or other metal metallic material and once manufactured at this stage, has to be split into two halves.

The cage 14 is to be split generally in a plane including the axis B-B shown in FIG. 2, and also including the rotation axis A-A. The struts 22 in this plane are slightly different format to the other struts 21 as will be clear from viewing the later Figures.

Figure 3:
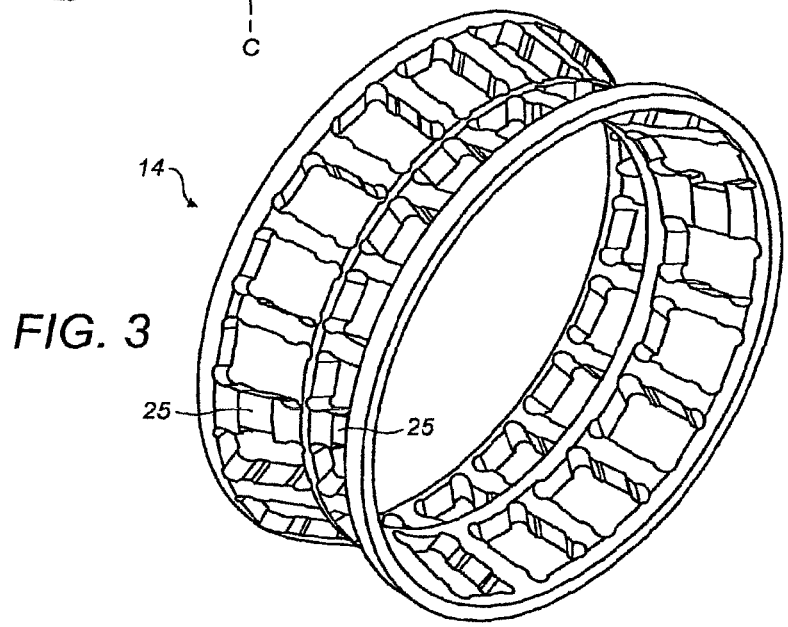
FIG. 3 is a similar perspective view of the roller cage of FIG. 2 after splitting, the two halves being held together by clips.

FIG. 3 shows the cage after it has been split into two halves and reassembled, the two halves being held together by clips 25.

We now refer to FIGS. 4-7.

Figure 4:
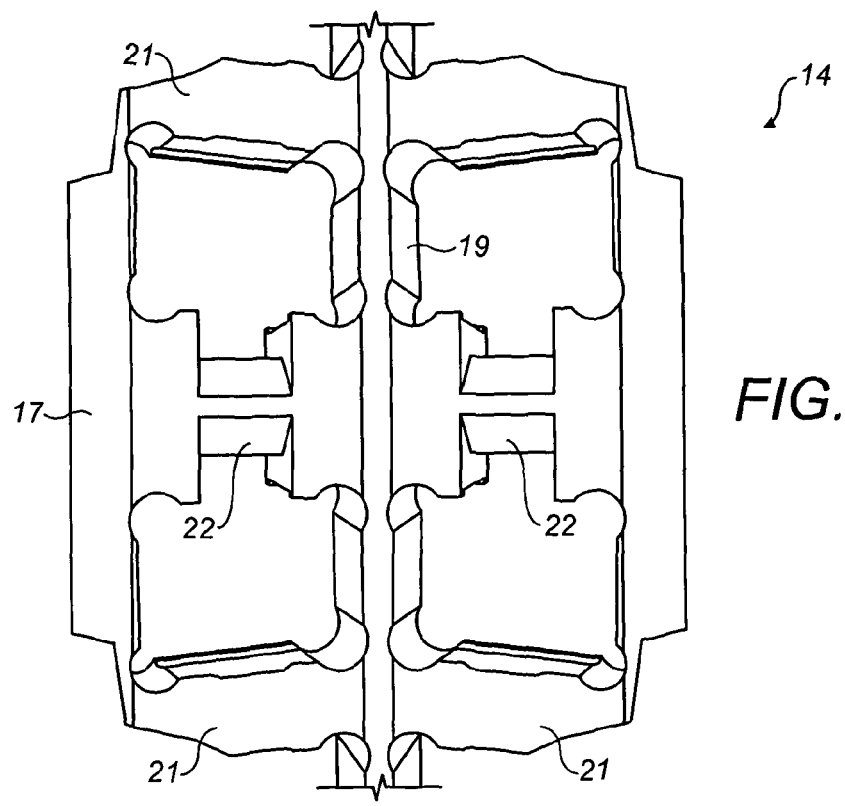
FIG. 4 is a partial view along the transverse axis B-B of FIG. 2, in the direction of the arrow on the axis B-B, before splitting of the cage.

FIG. 4 shows a view in the direction of the arrow B of FIG. 1 of the part of the cage adjacent the plane A-A, B-B.

Various methods may be used to split the cage 14 into two halves (referred to as the lower half 14L and the upper half 14U in this case) but which ever method is used some metal is removed. We will describe the present invention in relation to splitting the cage.

Figure 5:
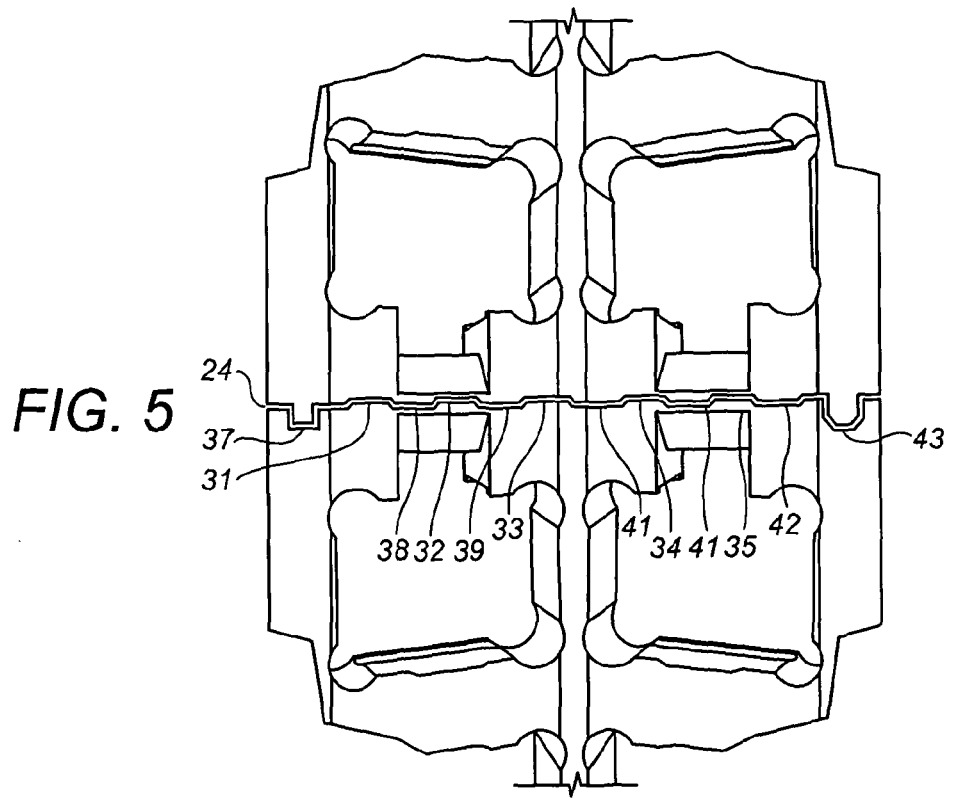
FIG. 5 is a view similar to FIG. 4 after the cage has been split generally in a plane A-B defined by the axes A-A, B-B of FIG. 2, the two split halves of the cage being in the original orientation and showing the material removed in the splitting process.

The cage 14 is cut into two semicircular parts 14L and 14U by means of electrical discharge machining (EDM), sometimes referred to as spark erosion. This is carried out by means of a wire which is passed through the cage and a series of rapidly recurring current discharges is provided which erodes the material of the cage 14. The wire is in the form of a straight length which is parallel to the axis B-B in FIG. 2 and generally in the plane of A-A. The length of wire extends beyond opposite sides of the cage so that radially opposite sides of the cage are split simultaneously. The wire is passed through the cage and the spark erosion takes place. The path of the wire and hence the shape of the cut is shown in FIG. 5 by the cut line 24. Because the wire passes simultaneously through radially opposite sides of the cage, the shape of the cut in the opposite side will be the same (albeit a mirror image when viewed from the opposite side looking towards the axis).

The width 26 of the cut line 24 depends upon the diameter of the wire and the voltage and other factors but will generally be the same throughout the length of the cut, and of a known and predictable width 'w'.

We now refer to FIG. 5 in particular and the shape and configuration of cut line 24.

As the wire passes across and through each radially opposite side of the cage, it will be noted that the wire passes through the struts 22. The path 24 is generally linear in the plane A-A but is displaced up and down with respect to the plane as it passes through the cage to produce a series of projections and recesses. In this case we will refer to the projections as those parts formed by the wire EDM process which extend into the surface of the opposite half. The projections have been numbered 31-35 for the lower half 14L and 37-43 for the upper half 14U.

It will be noted that throughout most of their widths (as viewed in FIG. 5, the projections 31 to 35 from the lower half 14L and the projections 38-42 from the upper half 14U are flat and parallel to the plane A-B and the widths (from left to right in FIG. 5) of pairs of projections 31-42; 38-35; 32-41; 39-34; 33-40 are the same. The projections of each pair 31-42; 38-35; 32-41; 39-34; 33-40 are equidistant from and on opposite sides of the central circumferential line 29.

As can been seen, the width 'w' of the cut line 24 is shown in FIG. 5 and is equal to the difference in height between a projection and adjacent recesses.

Once the cage 14 has been split as shown in FIG. 5, one of the two halves 14U and 14L is rotated about the axis C-C of FIG. 2 through 180° with respect to the other. The effect of this is to bring together the projections. If we label the projections on one radial side of the cage 14 with the suffix L and those on the other radial side with the suffix R, it will be seen in FIG. 6 that as a result of that rotation, the projections 31L and 42R abut one another and similarly projections 32L and 41R; 33L and 40R; 34L and 39R; 35L and 38R.

Figure 6:
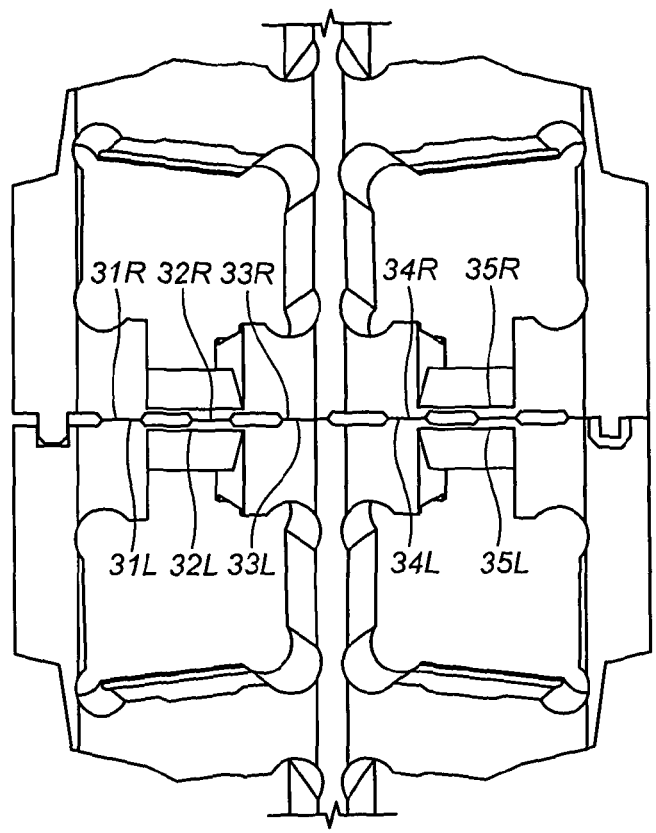
FIG. 6 is a view similar to FIG. 5 with one of the two cage halves rotated 180° with respect to the other about the axis C-C of FIG. 2 into their final orientation relative to one another.

This is the situation shown in FIG. 6 where one of the cage halves 14L and 14U has been rotated through 180° about the axis C-C with respect to the other cage half and the relevant pairs of projections have been brought into engagement with one another.

It will be understand that because of the depth of each projection, the two halves of the cage are held apart by exactly the amount to compensate for the metal removed in the splitting process. Furthermore, because there are a number of projections across the width (in FIG. 6) of each cage side, then the two halves of the cage will be accurately and stably aligned.

To further align the two cage halves after cutting, tenons and recess are provided at 37 and 43.

Thus, in more detail referring to FIG. 5, the line cut by the wire in the two outer rings can be seen. To the left-hand side of FIG. 5 there is shown a shallow and narrow recess 37 and in the right-hand side, there is shown a wider and deeper recess 43. The effect of this is shown in FIG. 6 wherein the downwardly projecting part on the right-hand side of FIG. 5 forms a tenon 46 which engages snugly within the recess 47 formed on the left-hand side of the lower part of the cage ring. This properly aligns the two halves of the ring (bear in mind that there will be a similar tenon formed on the opposite side of the cage, on the opposite ring), which prevents movement of the two halves of the cage in a direction parallel to the axis A-A.

Figure 7:
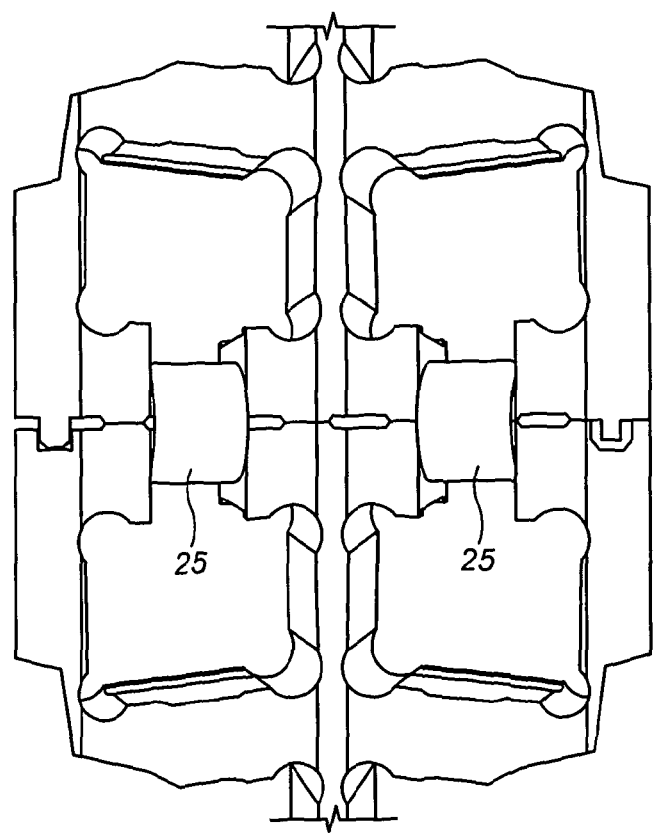
FIG. 7 shows a view similar to FIG. 6 of the two cage halves assembled together with clips.

The final step to assemble the cage is shown in FIG. 7 in which spring clips 25 are engaged with the struts 23. Because the tenons 46 and projections 31-36 are properly aligning the two halves of the cage, the clips 25 can be relatively loose.

After manufacture and when the cage is assembled with clips, each half of the cage is marked near one joint so as to ensure correct pairing and orientation of the cage halves when they are subsequently dissembled for servicing.

The invention is not restricted to the details of the foregoing

For example, we have described a taper roller bearing arrangement with two rows of rollers.

In some circumstances a single row of rollers may be used with the cage comprising only two rings 17, 18 without the intervening ring 19 and as already referred to the bearing roller elements may be balls rather than rollers.

Rather than using clips 25, the two halves of the cage can be held together by fixings such as screws, bolts or rings.

The invention claimed is:
1. A method of splitting a ring or a cage for a roller or ball bearing, comprising splitting a ring into two semicircular halves in such a way that there are provided projections and recesses in the facing surfaces thereby produced, whereby the two halves of the split ring may be reassembled in opposite orientation so that the projections on the facing surfaces of the two halves of the ring engage with one another to space the two halves of the ring apart, to restore the ring to a circular ring shape despite some of the material of the ring having been removed in the splitting process.

2. A method as claimed in claim 1 in which the splitting process is carried out on diametrically opposite sides of the ring.

3. A method as claimed in claim 2 in which the splitting process is carried out on each of the opposite sides of the ring simultaneously.

4. A method as claimed in claim 3 in which the splitting process is carried out on opposite sides of the ring in such a way as to provide an identical cut pattern on the facing surfaces of the two halves of the ring.

5. A method as claimed in claim 1 in which the ring has a first edge and a second opposite edge, and in which the splitting process is carried out to provide engaging projections on opposite sides of a circumferential line central between the first and second edges.

6. A method as claimed in claim 5 in which the projections on each side of the central circumferential line are provided in at least one pair which is equidistant from the central circumferential line.

7. A method as claimed in claim 1 in which the splitting of the ring into two semicircular halves is carried out by means of electrical discharge machining.

8. A method as claimed in claim 1 in which the splitting of the ring is carried out by means of a wire which is passed through the ring and a series of rapidly recurring current discharges is provided which erodes the material of the ring.

9. A method of splitting a ring or a cage for a roller or ball bearing, comprising splitting a ring in such a way that there are provided projections and recesses in the facing surfaces thereby produced, whereby the two halves of the split ring may be reassembled in opposite orientation so that the projections on the facing surfaces of the two halves of the ring engage with one another to space the two halves of the ring apart, to restore the ring to a circular ring shape despite some of the material of the ring having been removed in the splitting process, in which the reassembling process in opposite orientation is carried out by rotating one half of the split ring through 180° about an axis at right-angles to the axis of the ring and at right-angles to a line between the cuts in the ring.

10. A method of splitting a ring or cage for a roller bearing or ball bearing, comprising splitting a ring or cage into two radially opposite halves in such a way that there are provided projections and recesses in facing surfaces thereby produced, whereby respective halves of the split ring or cage are adapted to be reassembled in opposite orientation so that projections on the surfaces of each half engage with one another to space the two halves of the ring or cage apart, to restore the ring or cage to a circular shape despite some of the material of the ring or cage having been removed in the splitting process.

11. A method as claimed in claim 10 in which the splitting process is carried out on each of the opposite sides of the ring or cage simultaneously.

12. A method as claimed in claim 11 in which the splitting process is carried out on opposite sides of the ring or cage in such a way as to provide an identical cut pattern on the facing surfaces of the two halves of the ring or cage.

13. A method as claimed in claim 10 in which the ring or cage has a first edge and a second opposite edge, and in which the splitting process is carried out to provide engaging projections on opposite sides of a circumferential line central between the first and second edges.

14. A method as claimed in claim 13 in which the projections on each side of the central circumferential line are provided in at least one pair equidistant from the central circumferential line.

15. A method as claimed in claim 10 in which the reassembling process in opposite orientation is carried out by rotating one half of the split ring or cage through 180° about an axis at right-angles to the axis of the ring or cage and at right-angles to a line between the cuts in the ring or cage.

16. A method as claimed in claim 10 in which the splitting of the ring or cage into two semicircular parts is carried out by means of electrical discharge machining.

17. A method as claimed in claim 10 in which the splitting of the ring or cage is carried out by means of a wire which is passed through the ring or cage and a series of rapidly recurring current discharges is provided which erodes the material of the ring or cage.

* * * * *